United States Patent [19]

Kagata

[11] 4,438,836
[45] Mar. 27, 1984

[54] FREEWHEEL HUB ASSEMBLY

[75] Inventor: Tooru Kagata, Toyota, Japan

[73] Assignee: Aisin Seiki Kabushiki Kaisha, Kariya, Japan

[21] Appl. No.: 256,575

[22] Filed: Apr. 22, 1981

[30] Foreign Application Priority Data

Apr. 24, 1980 [JP] Japan .................................. 55-56625
Apr. 25, 1980 [JP] Japan .................................. 55-54241

[51] Int. Cl.³ ........................ F16D 41/07; F16D 41/08
[52] U.S. Cl. ......................................... 192/36; 192/44; 403/1
[58] Field of Search ..................... 192/35, 36, 44, 50; 403/1

[56] References Cited

U.S. PATENT DOCUMENTS 4,230,211 10/1980 Goto et al. ............................ 192/44

FOREIGN PATENT DOCUMENTS 53-93241 8/1978 Japan .

Primary Examiner—Allan D. Herrmann
Attorney, Agent, or Firm—Finnegan, Henderson, Farabow, Garrett & Dunner

[57] ABSTRACT

A freewheel hub assembly has a wheel hub rotatably supported by a bearing on a steering knucle and a freewheel mechanism is provided for connecting the wheel hub with a driving axle in such a manner that a rotating torque can be transmitted from the axle to the wheel hub but the wheel hub is freely rotatable when the axle is not rotating. The freewheel mechanism includes a roller cage carrying a plurality of rollers. A retarder shoe is attached to one axial end of the cage. The one end of the cage is formed with a plurality of circumferentially spaced axial cutouts to provide a plurality of axial projections and the retarder shoe is formed with cutouts complementary to the axial projections of the cage so that the retarder shoe can be axially slidably fitted to the cage.

7 Claims, 12 Drawing Figures

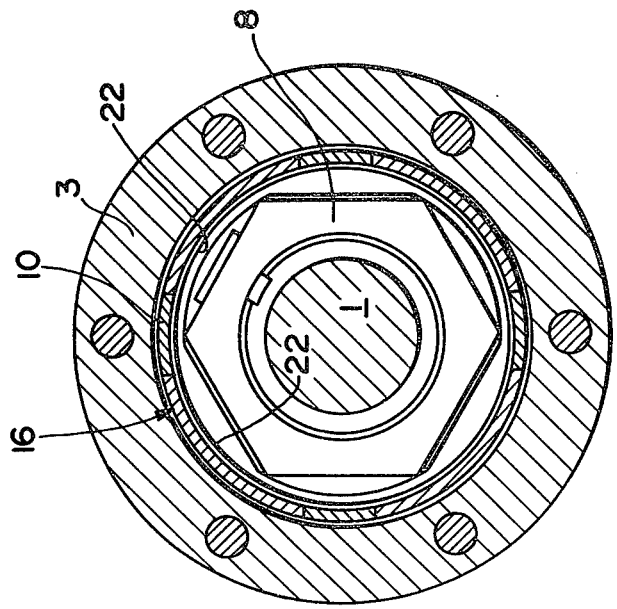
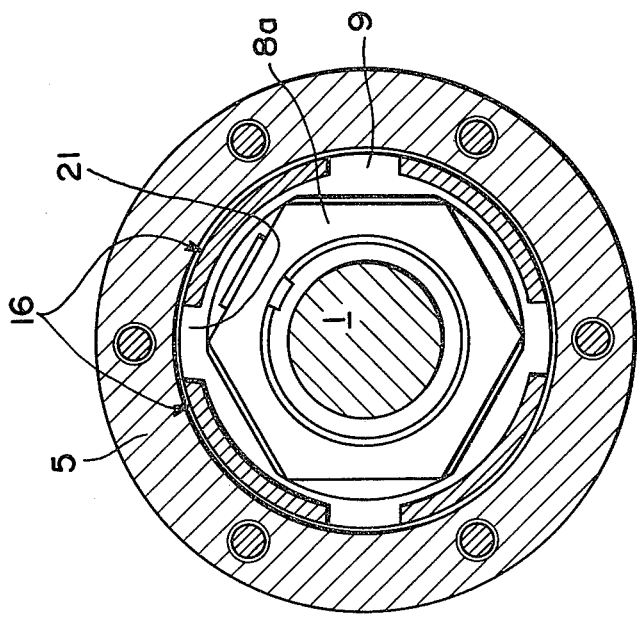

FREEWHEEL HUB ASSEMBLY

The present invention relates to a freewheel hub assembly adapted to be used in an automobile wheel.

In a four wheel drive type automobile, front wheels are arranged not only for steering movement but also for driving connection with the engine. For that purpose, the front wheels are connected with a differential gear assembly which is in turn connected with a power transmission gear device. In order to make it possible to use the automobile as a two wheel drive type one, a clutch mechanism may be provided between the differential gear assembly and the power transmission gear device so that the power transmission can be interrupted by the clutch mechanism. At this instance, it is also desirable to make the front wheels freely rotatable with respect to the wheel driving axles. Thus, such front wheels generally include a freewheel hub assembly which transmits the driving torque only from the driving axle to the wheel.

A conventional freewheel hub assembly adopted for the purpose includes a freewheel mechanism comprised of an inner disc adapted to be connected with a driving axle and having a profiled outer periphery, an outer housing rotatable as a unit with a wheel hub and having a circular inner periphery, a roller cage disposed between the profiled outer periphery of the inner disc and the circular inner periphery of the outer housing and carrying a plurality of rollers. When the driving axle is not driven, the cage is free and the outer housing a freely rotatable with respect to the inner disc and vice versa so that there is no power transmitting connection between the driving axle and the wheel hub. However, when the driving axle is driven by the engine, the cage is circumferentially shifted and the rollers carried thereon are constrained between the profiled outer periphery of the inner disc and the circular inner periphery of the outer housing so that a power transmitting connection is established therebetween. In order to produce such a circumferential movement of the cage, the cage is provided at one end with a retarder shoe which is axially slidable with respect to the cage and can be brought into a sliding engagement with a stationary surface such as the surface of a disc carried by a steering knucle of the steering mechanism.

In this type of freewheel hub assembly, it is very important to assemble the various parts in correct positions. Incorrect assembling of the parts will cause an unsatisfactory operation of the hub assembly so that a lot of time is spent on labour in assembling and inspecting the freewheel hub assembly.

It is therefore an object of the present invention to provide a freewheel hub assembly which is convenient for assembling operations.

Another object of the present invention is to provide a freewheel hub assembly in which certain parts can preliminarily be assembled before they are put into final assembly.

A further object of the present invention is to provide a freewheel hub assembly in which the wheel hub can firmly be mounted on a stationary part such as a steering knucle by means of a lock nut.

According to the present invention, the above and other objects can be accomplished by a freewheel hub assembly comprising a wheel hub rotatably supported by bearing means on non-rotatable support means, freewheel means connecting said wheel hub with rotatable axle means in such a manner that rotating torque can be transmitted from said axle means to said wheel hub but the wheel hub is freely rotatable when the axle means is not rotating, said freewheel means including inner disc means adapted to be connected with said axle means to rotate therewith, said inner disc means having a profiled outer periphery, outer housing means rotatable with said wheel hub and having a circular inner periphery which is opposed to said profiled outer periphery of the inner disc means, roller cage means disposed between the outer periphery of the inner disc means and the inner periphery of the outer housing means, a plurality of rollers carried by said roller cage means, retarder means carried by said cage means and having friction surface means which is adapted to be brought into friction engagement with non-rotatable surface means, said retarder means being carried at one axial end of said cage means for axial movement through an engagement between at least one cut-out formed in said axial end of the cage means and at least one projection formed in said retarder means and complementary to said cut-out in the cage means.

In a preferable aspect of the present invention, said cage means and said retarder means have inner circumferential surfaces formed with circumferentially aligned grooves, a ring-shaped spring being engaged with said aligned grooves to thereby hold the cage means and retarder means together before they are assembled in the freewheel hub assembly. The non-rotatable surface means may be provided by retaining plate means which is adapted to be engaged with a polygonal surface of nut means for holding the bearing means on the non-rotatable support means to prevent loosening of the nut means. Spring means may be provided for biasing the retarder means against said non-rotatable surface means.

The outer periphery of the inner disc means may be of a polygonal shape having a plurality of chordwise flat surfaces. Alternatively, the outer periphery of the inner disc means may be curved so as to provide a plurality of raised portions and a plurality of recessed portions. When the axle means is not rotating, the rollers in the cage means are positioned at lower or central portions of the chordwise flat surfaces so that the outer housing and the wheel hub are freely rotatable with respect to the inner disc means and the axle means. When a driving effort is applied to the axle means, the inner disc means is rotated by the axle means. Since the retarder means is in frictional engagement with the non-rotatable surface means, the cage means carrying the retarder means is angularly displaced with respect to the inner disc means with the result that the rollers in the cage means are shifted to the raised portions of the periphery of the inner disc means. Thus, the rollers are constrained between the outer periphery of the inner disc means and the inner periphery of the outer housing means to thereby transmit driving torque from the inner disc means to the outer housing means.

According to the features of the present invention, the retarder means can readily be assembled on the cage means. By using the aforementioned ring-shaped spring, it is possible to hold the retarder means on the cage means before they are put into final assembly. Alternatively, the spring means for biasing the retarder means may be utilized for holding the retarder means on the cage means. For the purpose, the retarder means and the cage means may be provided with pawl means for engagement with the biasing spring means.

The above and other objects and features of the present invention will become apparent from the following descriptions of preferred embodiments taking reference to the accompanying drawings, in which:

FIG. 3 is a sectional view taken substantially along the line III—III in FIG. 1;

FIG. 4 is a sectional view taken substantially along the line IV—IV in FIG. 1;

Figure 1:
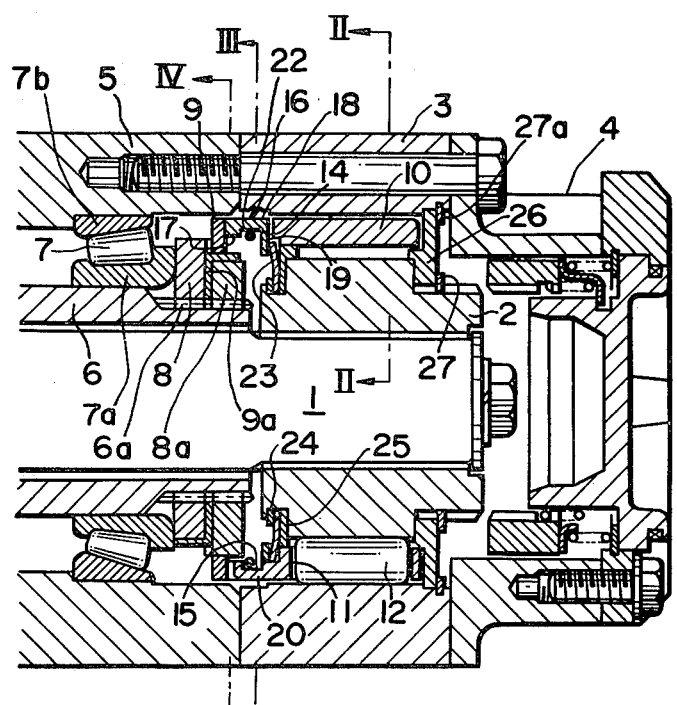
FIG. 1 is a sectional view of a freewheel hub assembly in accordance with one embodiment of the present invention.

Referring now to the drawings, particularly to FIGS. 1 through 5, the freewheel hub assembly shown therein includes a freewheel mechanism comprising an inner disc 2 engaged with an end of a driving axle 1 by means of a spline. The freewheel mechanism further includes an outer housing 3 which is connected at one end with an end cover 4 and at the other end with a wheel hub 5. The axle 1 extends through a support such as a steering knucle 6 which is mounted on an automobile body in a conventional manner.

The wheel hub 5 is carried for rotation on the steering knucle 6 by means of a taper roller thrust bearing 7 having an inner race 7a and an outer race 7b. The inner race 7a of the bearing 7 is fitted to the steering knucle 6 whereas the outer race 7b is fitted to the wheel hub 5. The inner race 7a of the bearing 7 has an end flange to which a retaining nut 8 is engaged at its end surface. The nut 8 is of a conventional type having a hexagonal outer surface and is threadably engaged with the external thread 6a formed on the knuckle 6.

A lock nut 8a of a hexagonal type is also engaged with the external thread 6a on the knuckle 6 and a retaining plate 9a is interposed between the nuts 8 and 8a. The retaining plate 9a has a pair of lugs one of which is bent over the outer surface of the nut 8 and the other over the outer surface of the nut 8a so that the nuts 8 and 8a are held against rotation.

A plate 9 in fitted to the locknut 8a as shown in FIG. 4. The plate 9 has straight inner edges which are placed against planar peripheral surfaces of the locknut 8a so that the plate 9 is held against rotation by the locknut 8a.

Figure 2:
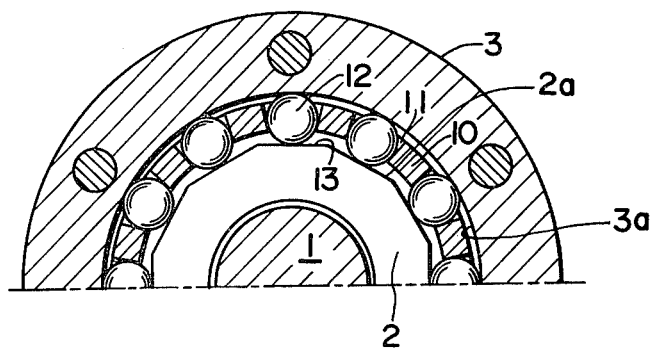
FIG. 2 is a fragmentary sectional view of the freewheel hub assembly taken substantially along the line II—II in FIG. 1.

As shown in FIG. 2, the outer housing 3 of the freewheel mechanism has a circular inner periphery 3a whereas the inner disc 2 has a polygonal outer periphery 2a including a plurality of chordwise planar surfaces 13. Between the outer periphery 2a of the inner disc 2 and the inner periphery 3a of the outer housing 3, there is provided a roller cage 10 of a cylindrical configuration having a plurality of roller openings 11. In the openings 11, there are respectively disposed rollers 12 of which axes are parallel with the axis of the inner disc 2.

At one axial end, the inner disc 2 has a bushing 25 which is fitted thereto and has a cylindrical outer surface for radially supporting the cage 10 so that it is maintained coaxially with the inner disc 2. At the other axial end, the inner disc 2 has an end retaining plate 26 which is secured to the disc 2 by means of a retaining clip 27. The radially outer edge of the plate 26 is slidable with respect to the outer housing 3 and held against axial movement by means of a retaining clip 27a.

Figure 5:
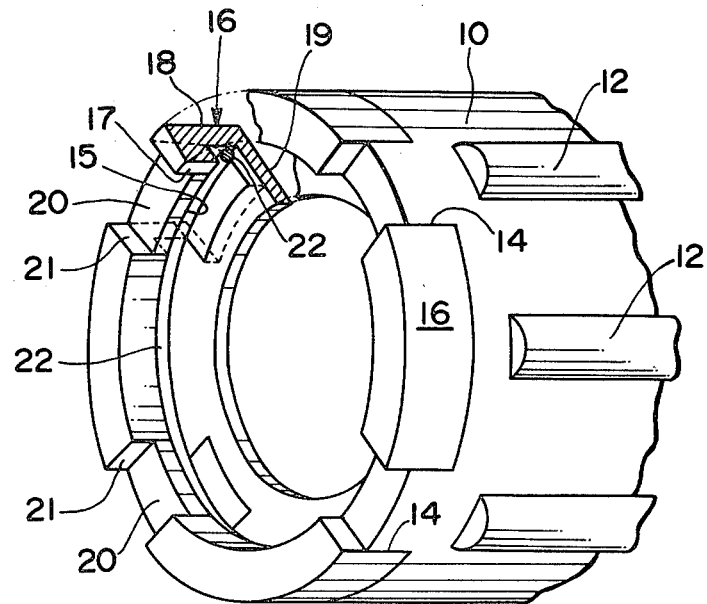
FIG. 5 is a partially cut-away perspective view of the roller cage with a retarder shoe attached thereto.

At the axial end of the cage 10 opposite to the retaining plate 26, there is a retarder shoe 16. As shown in FIG. 5, the cage 10 is formed at the axial end with a plurality of circumferentially spaced cutouts 14 to provide a plurality of axial projections 20. The shoe 16 is of a generally cylindrical configuration having an inner wall surface 17, an outer wall surface 18 and an annular end wall 19. The shoe 16 is formed at the cylindrical wall portion with a plurality of cutouts 21 for fitting engagement with the axial projections 20 on the cage 10. Through the engagement between the projections 20 and the cutouts 21, the retarder shoe 16 is axially slidably fitted to the cage 10.

The inner wall surface 17 of the shoe 16 and the inner surface of the projections 20 are formed with circumferentially aligned grooves 15 and a ring shaped spring 22 is placed in the grooves 15. In this manner, the retarder shoe 16 can be held on the cage 10 before they are assembled in the freewheel assembly. These arrangements facilitate the assembling operation of the cage 10 and the retarder shoe 16.

As shown in FIG. 1, the inner disc 2 carries a dish-shaped spring 23 which has an inner periphery held on the disc 2 between a retaining clip 24 and the bushing 25. The outer periphery of the spring 23 is engaged with the end wall 19 of the retarder shoe 16 to thereby bias the shoe 16 towards the left in the plane of FIG. 1 so that it is slidably engaged with the plate 9 on the locknut 8a. In this arrangement, as a driving torque is applied to the axle 1 to thereby rotate the inner disc 2, the case 10 is angularly shifted due to the frictional engagement between the plate 9 and the retarder shoe 16 so that the rollers 12 carried in the cage 10 are moved to the raised portions on the periphery 2a of the inner disc 2 to lock the outer housing 3 on the inner disc 2. Thus, the driving torque is transmitted from the axle 1 to the wheel hub 5. When the axle 1 is stationary, the outer housing 3 is free to rotate with respect to the inner disc 2 because the rollers 12 are at the central portions of the planar surface 13. The rollers 12 are moved to their central positions in a conventional manner. See, for example, U.S. Pat. No. 4,230,211.

Figure 6:
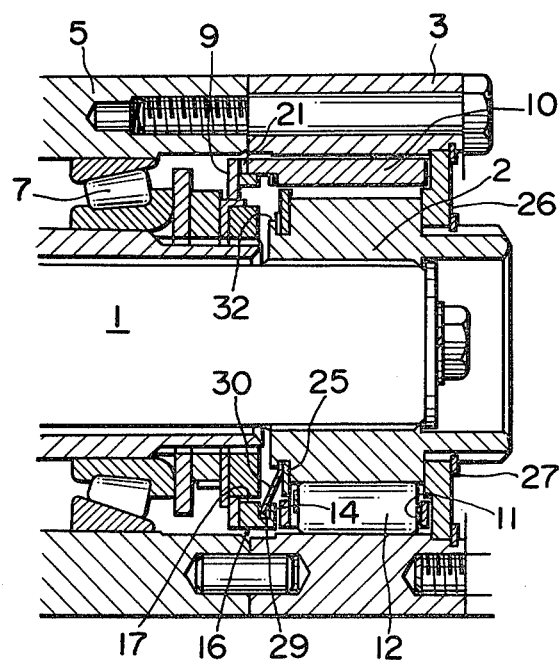
FIG. 6 is a sectional view of a freewheel hub assembly similar to FIG. 1 but showing another embodiment of the present invention.
Figure 7:
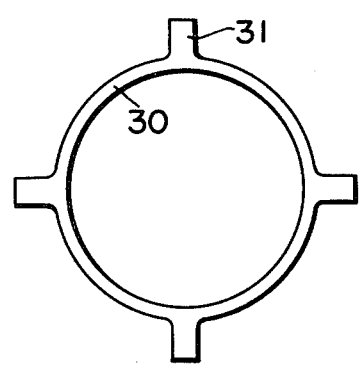
FIG. 7 is a front view of the retaining ring used in the freewheel hub assembly shown in FIG. 6.

Referring now to FIG. 6, the embodiment shown therein is substantially identical to the previously described embodiment so that corresponding parts are shown by the same reference numerals. In this embodiment, the cage 10 is formed with a plurality of axial cutouts 14 to provide axial projections 20 which are to be engaged with cutouts 21 in the retarder shoe 16 as in the previous embodiment. In this embodiment, the retarder shoe 16 is formed at the inner wall surface 17 with a circumferential groove 29. A dish-shaped spring 30 carried at the radially inner periphery on the inner disc 2 has radially outwardly extending arms 31 as shown in FIG. 7 and the arms are engaged with the groove 29 to bias the retarder shoe 16 against the plate 9. By engaging the arms 31 on the spring 30, it is possible to hold the shoe 16 on the cage 10 in an preliminary assembling stage.

Figure 8:
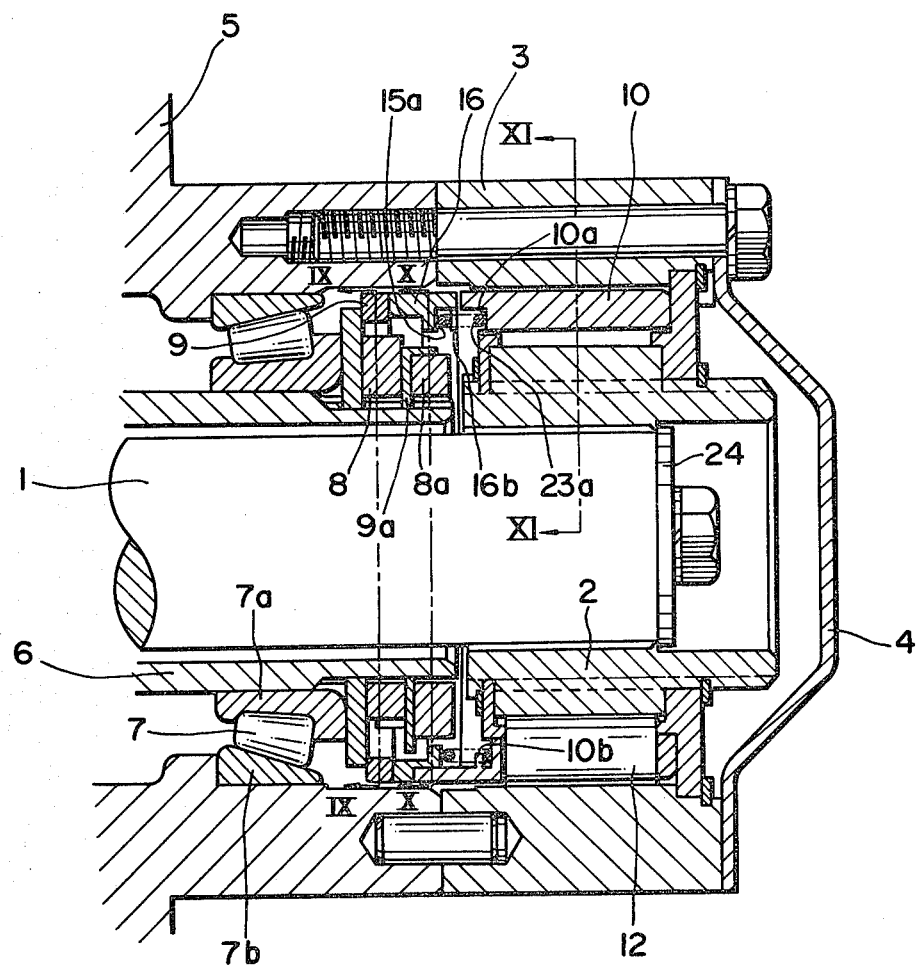
FIG. 8 is a sectional view of a freewheel hub assembly in accordance with a further embodiment of the present invention.
Figure 9:
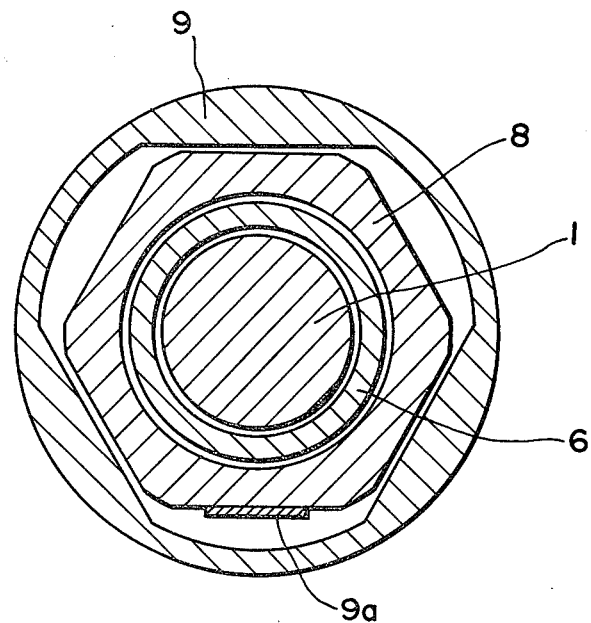
FIG. 9 is a sectional view taken substantially along the line IX—IX in FIG. 8.

Referring now to FIGS. 8 through 12, the embodiment shown therein is substantially identical to the previous embodiments so that corresponding parts are designated by the same reference numerals as in the previously discussed drawings. In this embodiment, the plate 9 providing the non-rotatable surface is placed around the nut 8 but not around the locknut 8a. As shown in FIG. 9, the plate 9 has an inner periphery formed with three chordwise edges which lie along the planar outer surfaces of the hexagonal nut 8 so as to be retained thereby against rotation.

Figure 10:
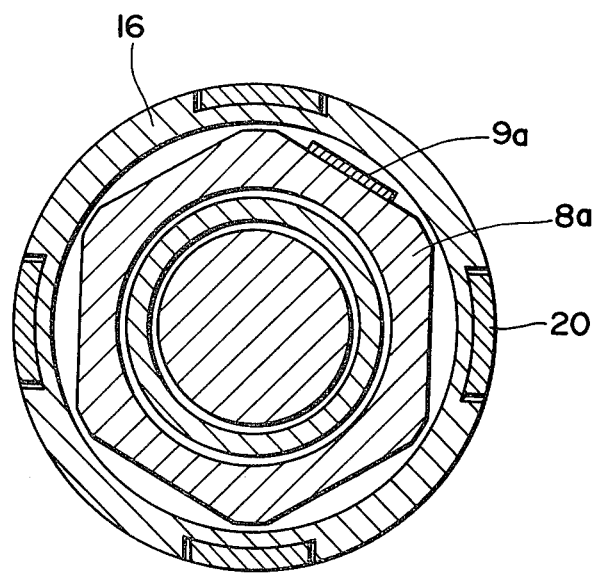
FIG. 10 is a sectional view taken sustantially along the line X—X in FIG. 8.
Figure 11:
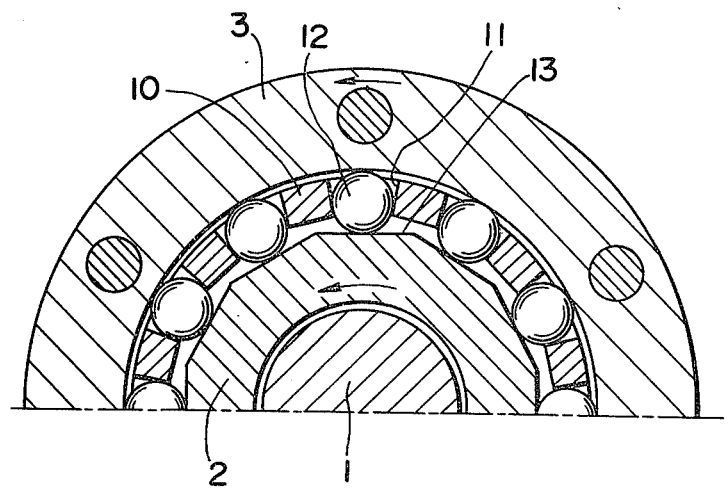
FIG. 11 is a fragmentary sectional view taken substantially along the line XI—XI in FIG. 8.
Figure 12:
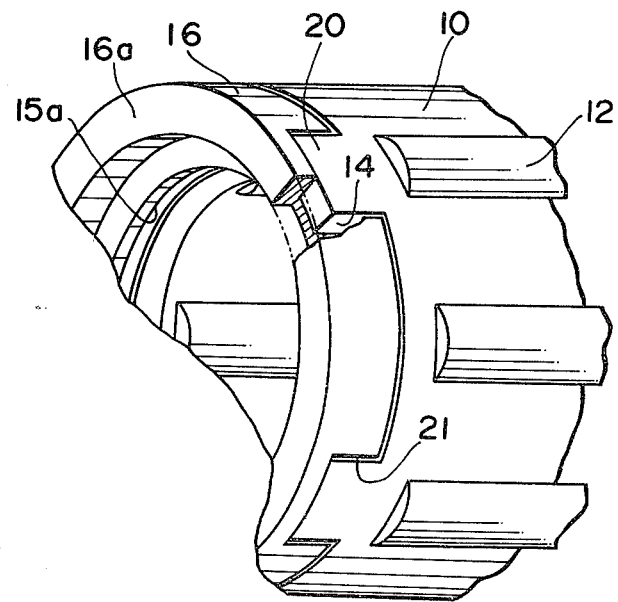
FIG. 12 is a perspective view of a roller cage used in the freewheel hub assembly shown in FIG. 8.

In FIG. 12, it will be noted that the roller cage 10 is formed at one axial end with a plurality of circumferentially spaced axial cutouts 14 to provide axial projections 20. The retarder shoe 16 is generally of a cylindrical configuration and formed with a plurality of axial cutouts 21 at an end adjacent to the cage 10. As in the previous embodiments, the shoe 16 is fitted at its cutouts 21 to the projections 20 of the cage 10. In this embodiment, however, the shoe 16 has a completely circular sliding surface 16a at an axial end opposite to the cutouts 21. As shown in FIGS. 8 and 10, the shoe 16 extends around the locknut 8a to the plate 9 carried on the nut 8. The cage 10 is formed at the inner surface of the end adjacent to the shoe 16 with a shoulder so as to provide a spring seat 10a. The retarder shoe 16 is also formed with a shoulder to provide a spring seat 15a which is opposed to the spring seat 10a in the cage 10. A coil spring 23a is arranged to act between the spring seats 10a and 15a so as to bias the shoe 16 toward the plate 9.

In order to make it possible to maintain the retarder shoe 16 in a condition assembled on the cage 10, the shoe 16 is formed at the end adjacent to the cage 10 with one or more radially inwardly projecting fingers 16a which are adapted to be temporarily engaged with the coil spring 23a. The cage 10 is also formed at the axial end adjacent to the shoe 16 with one or more radially inwardly projecting fingers which are adapted to be temporarily engaged with the coil spring 23a. Thus, the retarder shoe 16 can be preliminarily assembled with the cage 10 before they are put into the final assembly.

The invention has thus been shown and described with reference to specific embodiments, however, it should be noted that the invention is in no way limited to the details of the illustrated structures but changes and modifications may be made without departing from the scope of the appended claims.

I claim:

1. A freewheel hub assembly comprising a wheel hub rotatably supported by bearing means on non-rotatable support means, retaining means mounted on said non-rotatable support means, non-rotatable surface means non-rotatably mounted on the radial periphery of said retaining means, freewheel means connecting said wheel hub with rotatable axle means for transmitting rotating torque from said axle means to said wheel hub but leaving the wheel hub freely rotatable when the axle means is not rotating, said freewheel means including inner disc means adapted to be connected with said axle means to rotate therewith, said inner disc means having a profiled outer periphery, outer housing means rotatable with said wheel hub and having a circular inner periphery opposed to said profiled outer periphery of the inner disc means, roller cage means disposed between the outer periphery of the inner disc means and the inner periphery of the outer housing means, a plurality of rollers carried by said roller cage means, retarder means carried by said cage means and having friction surface means adapted to be brought into friction engagement with said non-rotatable surface means, said retarder means being carried at one axial end of said cage means for axial movement through an engagement between at least one cut-out formed in said axial end of the cage means and at least one projection formed in said retarder means and complementary to said cut-out in the cage means.

2. A freewheel hub assembly in accordance with claim 1 in which said cage means and said retarder means have inner circumferential surfaces formed with circumferentially aligned grooves, a ring-shaped spring being engaged with said aligned grooves to thereby hold the cage means and retarder means together before they are assembled in the freewheel hub assembly.

3. A freewheel hub assembly in accordance with claim 1 in which said non-rotatable surface means is provided by retaining plate means which is adapted to be engaged with a polygonal surface of nut means for holding the bearing means on the non-rotatable support means to prevent loosening of the nut means.

4. A freewheel hub assembly in accordance with claim 1 in which spring means is provided for biasing the retarder means against said non-rotatable surface means.

5. A freewheel hub assembly in accordance with claim 4 in which means is provided for temporarily holding said retarder means on said cage means by said spring means.

6. A freewheel hub assembly in accordance with claim 1 in which said retaining means includes a nut, said nut having planar peripheral surfaces, and wherein said non-rotatable surface means is a plate having an aperture with straight edges aligned with said planar peripheral surfaces.

7. A freewheel hub assembly in accordance with claim 6 in which said nut is a lock nut.

* * * * *